K. W. JAPPE.
TIRE FABRIC.
APPLICATION FILED SEPT. 28, 1917.
1,318,876.
Patented Oct. 14, 1919.
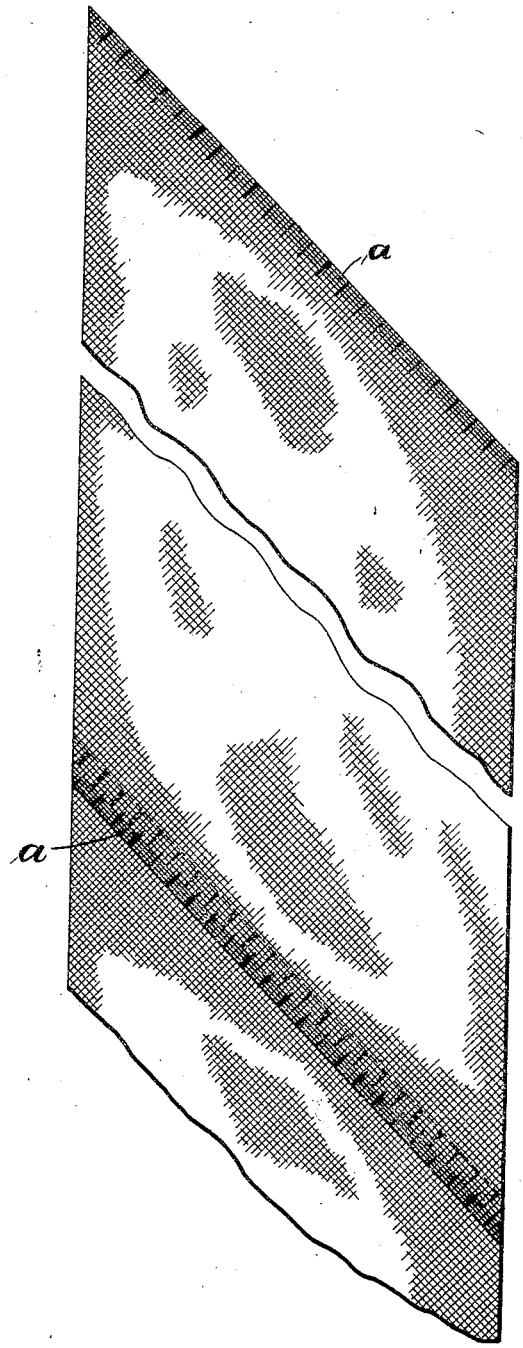
Inventor,
Kurt W. Jappe
by Shea Middleton Donaldson Shea
Atty's

UNITED STATES PATENT OFFICE.

KURT W. JAPPE, OF AKRON, OHIO, ASSIGNOR TO THE MILLER RUBBER COMPANY, OF AKRON, OHIO, A CORPORATION OF OHIO.

TIRE FABRIC.

1,318,876.  Specification of Letters Patent.  Patented Oct. 14, 1919.

Application filed September 28, 1917. Serial No. 193,810.

*To all whom it may concern:*

Be it known that I, KURT W. JAPPE, residing at Akron, State of Ohio, have invented certain new and useful Improvements in Tire Fabric, of which the following is a specification.

In the manufacture of friction tire fabric preparatory to its utilization in the building of tires it is customary to cut a wide strip of fabric on diagonal lines producing a series of narrow strips with selvage edges at the ends. These end selvage edges are joined by overlapping and pressing to produce continuous strips of any desired length which are usually wound up on supply rolls, with an interposed liner, to constitute a supply to be drawn upon in building the tires. The bias cutting causes the warp and weft to run diagonally to the cut edges of the fabric strips or to the length of the strips and produces a fabric having the necessary elasticity or capacity to distortion to enable it to be laid smoothly around the ring core. The presence of the two selvage edges in the lapped joint makes an inelastic portion which is detrimental and it has therefore been customary to cut or trim off the selvage edges, but which not only takes time and labor, but involves a positive waste of material.

It is the object of my invention to render unnecessary this waste or the cutting off of the inelastic selvage edge, and I do this by simply slitting the edge at intervals whereby the inelasticity of the edge is overcome and it becomes unnecessary to cut off the edge and thus waste is prevented. The selvage edge is normally thinner than the body of the fabric and tapers off in such a way that by leaving the selvage edges on the fabric the joints in the fabric caused by the splices are thinner than they would be if the selvage was removed.

In the accompanying drawing is simply shown a diagrammatic view of a piece of frictioned fabric, the left hand edge representing the selvage edge and in connection with this edge I show slits at intervals for the purposes of my invention, namely, to render unnecessary the cutting off of the edge and at the same time to overcome the relative inelasticity of the edge.

The fabric shown in the drawing is of the ordinary type and instead of removing the selvage edge indicated at *a* due to its relative inelasticity, I slit it at intervals which makes it just as elastic as the body of the material and renders it unnecessary to remove the edge with the consequent waste of time and the material.

What I claim is:

1. As a new article of manufacture, a selvage edged tire fabric having its selvage edges rendered elastic by a series of transverse slits, substantially as described.

2. As a new article of manufacture, a woven tire strip of friction fabric having selvage edges, the said edges being treated to make them elastic in the direction of the length of the edge, substantially as described.

3. A tire fabric composed of a series of relatively narrow strips or bias cut material having the selvage edges at the ends of said strips, said selvage edges being provided with a series of slits and the slitted portions of said edges being overlapped and adhering to each other to form a continuous strip, said strip being of equal elasticity, or capacity, for a deformation throughout its entire length, substantially as described.

KURT W. JAPPE.